INVENTOR.
GLENN L. KEISTER
BY
ATTORNEY

United States Patent Office 2,979,263
Patented Apr. 11, 1961

2,979,263
MULTIPLIER CIRCUIT

Glenn L. Keister, Seattle, Wash., assignor to Boeing Airplane Company, Seattle, Wash., a corporation of Delaware Filed Apr. 22, 1957, Ser. No. 654,270

3 Claims. (Cl. 235—194)

This invention relates to an electrical multiplier circuit and more particularly to a voltage multiplier circuit which is polarity sensitive.

Heretofore, various types of voltage multipliers have been produced. A fairly common type is one which comprises electronic tube components. However, such prior art voltage multipliers, although polarity sensitive, normally require a double-end input for each voltage to be multiplied in order to render the multiplier polarity sensitive. Thus, these prior art voltage multipliers and associated input equipment are fairly complex. In addition, owing to their complexity and due to the fact that tube components are utilized the power consumption of the multiplier is relatively high. Further, the tube components of the multiplier render it non-reliable and increase the maintenance costs.

An object of this invention is to provide a new and improved voltage multiplier.

Another object of this invention is to provide for multiplying two voltages by averaging a plurality of rectangular waves having an amplitude proportional to the magnitude of one of the two voltages and a time difference between two half-cycles of the rectangular waves proportional to the magnitude of the other of the two voltages.

A further object of this invention is to provide a simple voltage multiplier requiring only a single-ended input for each voltage to be multiplied and having a minimum of power consumption by magnetically coupling a modulator to a demodulator and rendering the modulator responsive to one of the voltages to be multiplied and magnetically controlling the phase shifting of the control voltage to the demodulator in accordance with the magnitude of the other voltage to be multiplied.

Still another object of this invention is to provide a reliable voltage multiplier requiring a minimum of maintenance.

Other objects of this invention will become apparent from the following description when taken in conjunction with the accompanying drawings in which.

Figure 1:
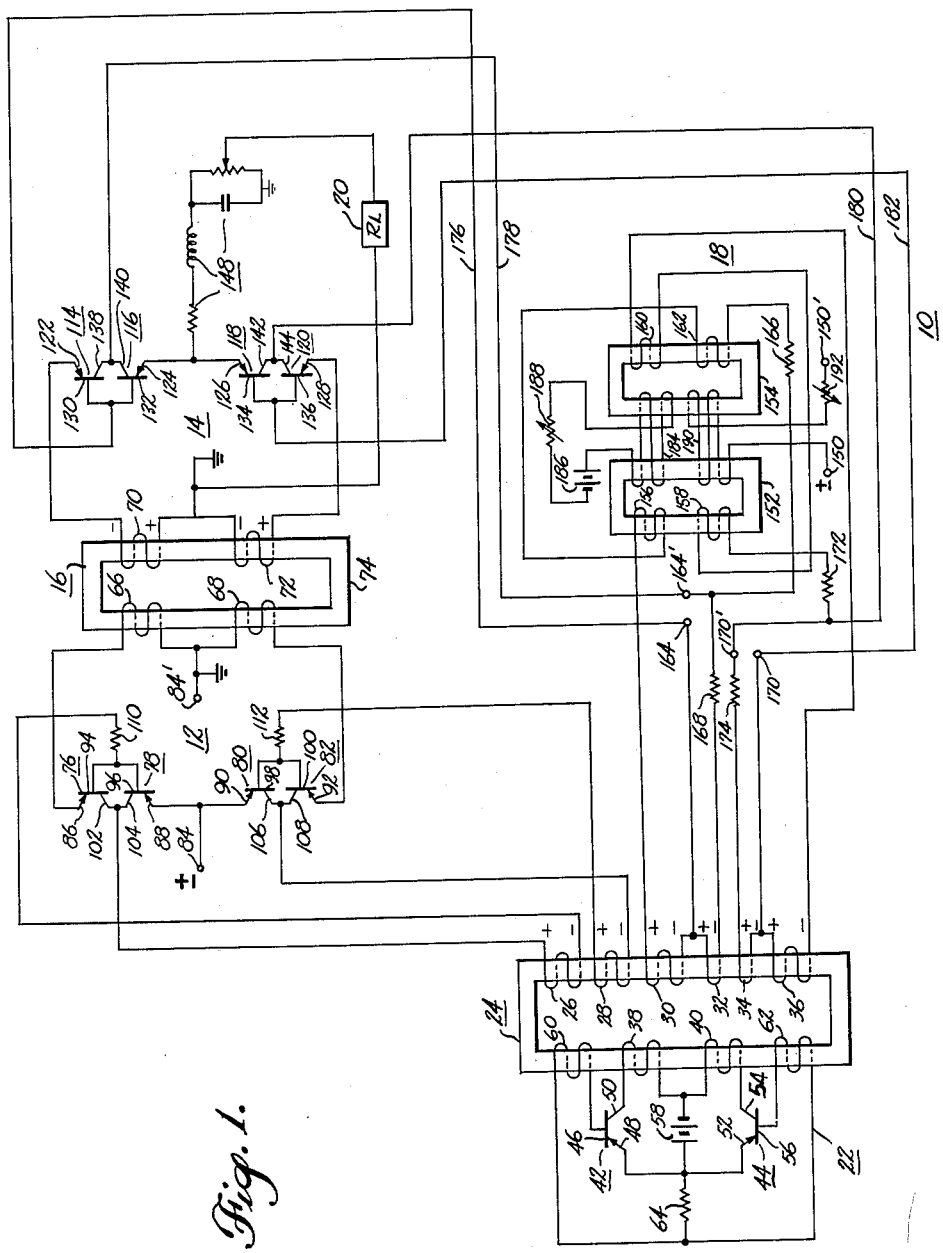
Fig. 1 is a schematic diagram of a voltage multiplier embodying the teachings of this invention.
Figure 2A:
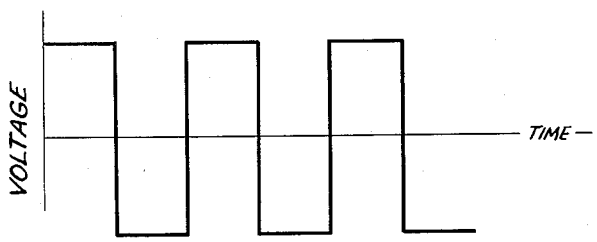
Fig. 2a is a graph illustrating the output voltages from the oscillator shown in Fig. 1.
Figure 2B:
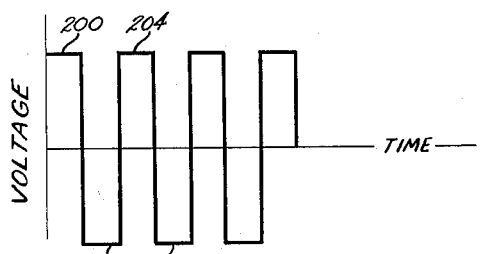
Fig. 2b is a graph illustrating the output voltage from the demodulator when one of the voltages to be multiplied is applied to the modulator of Fig. 1 and the other voltage to be multiplied is not applied to the phase-shift circuit of Fig. 1.
Figure 2C:
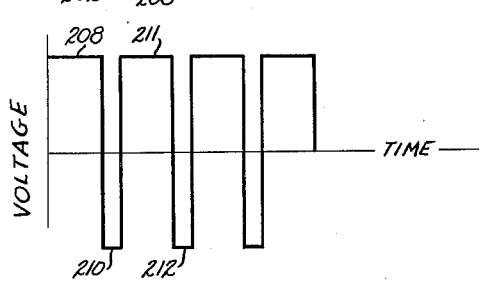
Fig. 2c is a graph illustrating the output voltage from the demodulator when a voltage to be multiplied and of a given polarity is applied to the modulator of Fig. 1 and the voltage to be multiplied of a given polarity is applied to the phase-shift circuit.
Figure 2D:
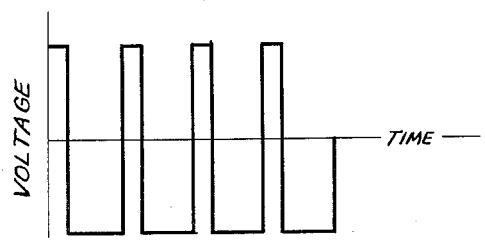
Figure 2E:
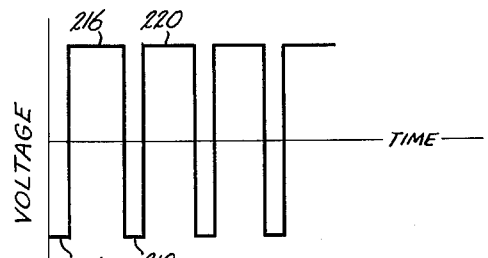

Fig. 2d is a graph illustrating the output voltage from the demodulator of Fig. 1 when the multiplying voltage applied to the phase-shift circuit is of opposite polarity from that of Fig. 2c, Fig. 2e is a graph illustrating the output voltage from the demodulator of Fig. 1 when the polarity of the multiplying voltage applied to the phase-shift circuit is the same as in Fig. 2d and the polarity of the multiplying voltage applied to the modulator is opposite to that of Figs. 2b, 2c and 2d.

Referring to Fig. 1 there is illustrated a voltage multiplier 10 embodying the teachings of this invention. In general, the voltage multiplier 10 comprises a modulator 12, which produces at its output an alternating rectangular wave-shaped voltage whose magnitude is proportional to the magnitude of the multiplying voltage applied to the modulator 12 and whose phase position is determined by the polarity of the multiplying voltage; a demodulator 14 which is magnetically coupled to the modulator 12 by means of a transformer 16 and which is responsive to the output voltage of the modulator 12; a magnetic type phase-shift circuit 18 whose output is connected to control the switching operation of the demodulator 14 and thus the voltage across a load 20 in accordance with the magnitude and polarity of a multiplying voltage applied to the phase-shift circuit 18; and an oscillator 22 which is connected to control the switching operation of the modulator 12 and which is connected to effect a flow of load current to the phase-shift circuit 18.

The oscillator 22 is of a well-known type which produces at its output a plurality of alternating voltages of rectangular wave-shape and which comprises a magnetic core member 24 which is preferably constructed of a material having a rectangular hysteresis loop characteristic. Output windings 26, 28, 30, 32, 34 and 36 are disposed in inductive relationship with the magnetic core member 24. Also disposed in inductive relationship with the magnetic core member 24 are main windings 38 and 40. In order to alternately effect a flow of current through the main windings 38 and 40, respectively, switching transistors 42 and 44 are provided. In this instance, the transistor 42 is a p-n-p junction type transistor and comprises a base electrode 46, an emitter electrode 48, and a collector electrode 50. In like manner, the transistor 44 is a p-n-p junction type transistor and comprises an emitter electrode 42, a collector electrode 54, and a base electrode 56.

A source of direct current, specifically a battery 58, is interconnected with the main windings 38 and 40 and with the transistors 42 and 44 to alternately effect a flow of current through the main windings 38 and 40 in accordance with the switching operation of the transistors 42 and 44. Specifically, a series circuit including the emitter electrode 48, of the transistor 42, the collector electrode 50, and the main winding 38 is connected across the battery 58. In like manner, a series circuit including the emitter electrode 52, of the transistor 44, the collector electrode 54, and the main winding 40 is connected across the battery 58.

To hold the transistor 42 conductive when it is conducting load current and to maintain the transistor 42 non-conductive when the transistor 44 is conducting load current a hold winding 60 is disposed in inductive relationship with the magnetic core member 24 and is interconnected with the emitter and base electrodes 48 and 46, of the transistor 42, through a current limiting resistor 64. Similarly, for the purpose of holding the transistor 44 conductive when the transistor 44 is conducting load current and for holding the transistor 44 non-conductive when the transistor 42 is conducting load current a hold winding 62 is disposed in inductive relationship with the magnetic core member 24 and is interconnected with the emitter and base electrodes 52 and 56, of the transistor 44, through the current-limiting resistor 64.

The operation of the oscillator 22 will now be briefly described. Assuming the transistor 42 is conducting load current, current flows from the positive terminal of the battery 58 through the emitter electrode 48, of the transistor 42, the collector electrode 50, and the main winding 38, to the negative terminal of the battery 58. Such current flow effects an induced voltage across the hold winding 60 of such a polarity as to render the emitter electrode 48, of the transistor 42, positive with respect to the base electrode 46. This holds the transistor 42 in the conducting state. However, simultaneously a voltage is induced across the hold winding 62 of such a polarity as to render the base electrode 56, of the transistor 44, positive with respect to the emitter electrode 52. This in turn holds the transistor 44 in a non-conductive state. The current flow through the main winding 38 also effects induced voltages across the output windings 26, 28, 30, 32, 34 and 36 and of a polarity as shown in Fig. 1.

Once the magnetic core member 24 has been driven to saturation, due to the current flow through the main winding 38, and as the saturation flux returns to the residual state the polarity of the voltages across the hold windings 60 and 62 reverse. When this takes place the polarity of the voltage induced across the hold winding 60 is such as to render the base electrode 46, of the transistor 42, positive with respect to the emitter electrode 48. This renders the transistor 42 non-conducting. However, the voltage induced across the hold winding 62 when this residual state is reached is such as to render the emitter electrode 52, of the transistor 44, positive with respect to the base electrode 56. This renders the transistor 44 conductive and load current flows from the positive terminal of the battery 58 through the emitter electrode 52, of the transistor 44, the collector electrode 54, and the main winding 40, to the negative terminal of the battery 58. The current flow through the main winding 40 effects an induced voltage across the hold winding 62 of such polarity as to render the emitter electrode 52, of the transistor 44, positive with respect to the base electrode 56. Thus, the transistor 44 is maintained in a conducting state. However, the voltage induced across the hold winding 60 is of such polarity as to render the base electrode 46, of the transistor 42, positive with respect to the emitter electrode 48. This, in turn, holds the transistor 42 non-conductive. The current flow through the main winding 40 induces voltages across the output windings 26, 28, 30, 32, 34 and 36; however, the voltages induced are of opposite polarity from that shown in Fig. 1.

The transformer 16 comprises primary windings 66 and 68 and secondary windings 70 and 72, all of which are disposed in inductive relationship with a magnetic core member 74. In operation, the transformer 16 acts as a magnetic coupling between the modulator 12 and the demodulator 14.

Referring more particularly to the modulator 12, the modulator 12 comprises switching means, specifically p-n-p junction type transistors 76, 78, 80 and 82, for alternately effecting a flow of current through the primary windings 66 and 68, of the transformer 16. One of the voltages, $V_x$, to be multiplied is applied to the terminals 84 and 84'. For the purpose of blocking voltages of both polarities as applied to the terminals 84 and 84', the transistors 76 and 78 and the transistors 80 and 82 are connected back-to-back.

The transistors 76, 78, 80 and 82 comprise emitter electrodes 86, 88, 90 and 92, respectively; base electrodes 94, 96, 98 and 100; and collector electrodes 102, 104, 106 and 108, respectively. In order to control the flow of current through the primary windings 66 and 68, of the transformer 16, in accordance with the magnitude of the voltage $V_x$ and in accordance with the switching operation of the transistors 76, 78, 80 and 82, primary windings 66 and 68 are connected in circuit relationship with the terminals 84 and 84' and with the transistors 76, 78, 80 and 82. As shown, a series circuit including the emitter electrode 88, of the transistor 78, the collector electrode 104, the collector electrode 102, of the transistor 76, the emitter electrode 86, and the primary winding 66, of the transformer 16, is connected across the terminals 84 and 84'. A series circuit including the emitter electrode 90, of the transistor 80, the collector electrode 106, the collector electrode 108, of the transistor 82, the emitter electrode 92, and the primary winding 68, of the transformer 16, is also connected across the terminals 84 and 84'.

For the purpose of effecting a switching operation of the transistors 76, 78, 80 and 82 in accordance with the frequency of the oscillator 22 to thus alternately effect a flow of current through the primary windings 66 and 68, of the transformer 16, the transistors 76 and 78 are connected in circuit relationship with the output winding 26, of the oscillator 22, through a current-limiting resistor 110, and the transistors 80 and 82 are connected in circuit relationship with the output winding 28 through a current-limiting resistor 112. In operation, the current-limiting resistors 110 and 112 function to provide the desired switching current for the transistors 76 and 78, and the transistors 80 and 82, respectively, and to limit the flow of control current through the transistors 76, 78, 80 and 82 to such a value as to prevent damage thereto.

Since in operation the magnetic core member 74, of the transformer 16, never saturates, the magnitude of the alternating voltage appearing across the secondary windings 70 and 72 is proportional to the amplitude of the voltage, $V_x$, applied to the terminals 84 and 84'. In addition, the phase position of the alternating voltages appearing across the secondary windings 70 and 72, of the transformer 16, is dependent upon the polarity of the voltage, $V_x$, applied to the terminals 84 and 84'.

Switching means, specifically transistors 114, 116, 118 and 120, are interconnected with the secondary windings 70 and 72 and with the output of the phase-shift circuit 18 to control the flow of current from the secondary windings 70 and 72 to the load 20 in accordance with the output from the phase-shift circuit 18. The transistors 114, 116, 118 and 120 include emitter electrodes 122, 124, 126 and 128, respectively; base electrodes 130, 132, 134, and 136, respectively; and collector electrodes 138, 140, 142 and 144, respectively. By connecting the transistors 114 and 116 and the transistors 118 and 120 back-to-back voltages of both polarities appearing across the secondary windings 70 and 72 are blocked.

A filter 148 is connected in series circuit relationship with the load 20, one end of the series circuit being connected to the junction point of the emitter electrodes 124 and 126, and the other end of the series circuit being connected to the junction point of the secondary windings 70 and 72, of the transformer 16. In operation, the filter 148 functions to integrate the output voltage of the demodulator 14, that is the voltage appearing between the junction point of the secondary windings 70 and 72 and the junction point of the emitter electrodes 124 and 126, to thus produce a voltage of a given polarity across the load 20 depending upon the polarity of the multiplying voltage, $V_x$, applied to the terminals 84 and 84' and the polarity of the multiplying voltage, $V_y$, applied to terminals 150 and 150', of the phase-shift circuit 18.

Referring more particularly to the phase-shift circuit 18, the phase-shift circuit 18 comprises magnetic core members 152 and 154 which are preferably constructed of a material having a rectangular loop hysteresis characteristic. Load windings 156 and 158 are disposed in inductive relationship with the magnetic core member 152. In like manner, load windings 160 and 162 are disposed in inductive relationship with the magnetic core member 154. In order to render the load windings 156 and 162 responsive to the voltages appearing across the output windings 30 and 32, of the oscillator 22, and in order to effect a reversal in the polarity of the voltage appearing across terminals 164 and 164' when both the magnetic core members 152 and 154 are in saturation, and thus the load windings 156 and 162 no longer support voltage, the output windings 30 and 32 are connected in circuit relationship with the load windings 156 and 162 and with the terminals 164 and 164′. In particular, the upper end of the output winding 30, as shown, is electrically connected to the terminal 164′ through the load windings 156 and 162, and a current-limiting resistor 166. A function of the current-limiting resistor 166 is to limit the flow of current through the load windings 156 and 162 when the magnetic core members 152 and 154 are in saturation. The junction point of the output windings 30 and 32 is electrically connected to the terminal 164 and the lower end of the output winding 32, as shown, is electrically connected to the terminal 164′ through a current-limiting resistor 168. In operation, the current-limiting resistors 166 and 168 effect a voltage division to thus effect a reversal of the polarity of the voltage appearing across the terminals 164 and 164′. In practice, the magnitude of the voltage appearing across the output winding 30 is approximately twice that of the voltage appearing across the output winding 32 and the magnitude of the voltage appearing across the output winding 36 is approximately twice that of the voltage appearing across the output winding 34.

The output windings 34 and 36, of the oscillator 22, are connected in circuit relationship with the load windings 158 and 160 and with terminals 170 and 170′ in order to render the load windings 158 and 160 responsive to the voltages across the output windings 34 and 36 and in order to effect a reversal of the polarity of the voltage across the terminals 170 and 170′ when both the magnetic core members 152 and 154 are in saturation and the load windings 158 and 160 no longer support voltage. Specifically, the lower end of the output winding 36, of the oscillator 22, is electrically connected to the terminal 170′ through the load windings 160 and 158 and a current-limiting resistor 172. In operation, the current-limiting resistor 172 functions to limit the magnitude of the current flow through the load windings 158 and 160 to a safe value when both the magnetic core members 152 and 154 are saturated. The junction point of the output windings 34 and 36 is electrically connected to the terminal 170 and the upper end of the output winding 34, as shown, is electrically connected to the terminal 170′ through a current-limiting resistor 174. In operation, the current-limiting resistors 172 and 174 function to provide a proper voltage division to thus effect a reversal of the polarity of the voltage between terminals 170 and 170′ when the load windings 158 and 160 are no longer supporting voltages and the magnetic core members 152 and 154 have been driven to saturation.

In order to control the switching operation of the transistors 114 and 116, of the demodulator 14, in accordance with the voltage appearing between the terminals 164 and 164′, the terminals 164 and 164′ are electrically connected to the transistors 114 and 116 by electrical conductors 176 and 178. In like manner, to render the transistors 118 and 120, of the demodulator 14, responsive to the voltage between the terminals 170 and 170′, the transistors 118 and 120 are electrically connected to the terminals 170 and 170′ by electrical conductors 180 and 182.

A bias circuit, including a bias winding 184 which is disposed in inductive relationship with the magnetic core members 152 and 154, a battery 186 and a variable resistor 188, is provided to bias the magnetic core members 152 and 154 into negative saturation when no voltage, $V_y$, is applied to the terminals 150 and 150′. In practice, the variable resistor 188 is so adjusted as to effect a current flow through the bias winding 184 of such magnitude as to cause, when no voltage, $V_y$, is applied to the terminals 150 and 150′, a saturation of both magnetic core members 152 and 154 at approximately 90 degrees or one-quarter cycle of the voltages applied to the load windings of the phase-shift circuit 18. A control winding 190 is disposed in inductive relationship with both the magnetic core members 152 and 154 to reset the flux level in the magnetic core members 152 and 154 to a predetermined value depending upon the magnitude and polarity of the voltage $V_y$ to thus vary the phase angle at which both the magnetic core members 152 and 154 become saturated, this variation being in accordance with the magnitude of the voltage, $V_y$, applied to the terminals 150 and 150′. For the purpose of controlling the linearity of the phase-shift circuit 18 a variable resistor 192 is connected in series circuit relationship with the control winding 190.

The operation of the apparatus and circuits shown in Fig. 1 will now be described with reference to Figs. 2a through 2e. Assuming that the voltage, $V_x$, to be multiplied is applied to the terminals 84 and 84′ such that the terminal 84 is positive with respect to the terminal 84′, and assuming further that the voltage $V_y$ is not applied to the terminals 150 and 150′, of the phase-shaft circuit 18, and the polarity of the voltages across the output windings 26, 28, 30, 32, 34, and 36, of the oscillator 22, is as shown in Fig. 1, then the transistors 76 and 78 are biased so as to be in a conductive state and the transistors 80 and 82 are so biased as to be in a non-conductive state. Such being the case, current flows from the terminal 84 through the emitter electrode 88, of the transistor 78, the collector electrode 104, the collector electrode 102, of the transistor 76, the emitter electrode 86, and the primary winding 66, of the transformer 16, to the terminal 84′. This current flow through the primary winding 66, of the transformer 16, effects induced voltages across the secondary windings 70 and 72 of a polarity as shown in Fig. 1.

As hereinbefore mentioned the ampere turns of the bias winding 184, of the phase-shift circuit 18, are such as to effect a saturation of both the magnetic core members 152 and 154 at approximately 90 degrees or one-quarter cycle of the switching voltages appearing across the output windings 30, 32, 34 and 36, of the oscillator 22, when the voltage, $V_y$, is not applied to the terminals 150 and 150′. The switching voltages appearing across the output windings 26, 28, 30, 32, 34 and 36, of the oscillator 22, are represented by the alternating voltage shown in Fig. 2a.

During the first-quarter cycle of the switching voltages appearing across the output windings 30 and 32 the point 164 is positive with respect to the point 164′. Under this condition the switching transistors 114 and 116 are held non-conductive. Specifically, the base electrodes 130 and 132 of the transistors 114 and 116, respectively, are maintained positive with respect to the collector electrodes 138 and 140, respectively. On the other hand, during the first-quarter cycle of the switching voltages appearing across the output windings 34 and 36, of the oscillator 22, the point 170′ is positive with respect to the point 170. Therefore, the transistors 118 and 120 are biased so as to be in a conductive state since the collector electrodes 142 and 144, of the transistors 118 and 120, are maintained positive with respect to the base electrodes 134 and 136, respectively. Thus, under the assumed conditions during the first-quarter cycle of the switching voltages appearing at the output of the oscillator 22 current flows from the lower end of the secondary winding 72, of the transformer 16, through the emitter electrode 128, of the transistor 120, the collector electrode 144, the collector electrode 142, of the transistor 118, the emitter electrode 126, the filter 148, and the load 20, to the upper end of the secondary winding 72, as shown. The voltage effecting this current flow is represented at 200 in Fig. 2b.

The reason why the point 164 remains positive with respect to the point 164′ during the first-quarter cycle of the switching voltages appearing at the output of the oscillator 22 is that during this first-quarter cycle the load windings 156 and 162, of the phase-shift circuit 18, offer a high impedance and thus the voltage across the output winding 32 is controlling. During this same quarter-cycle of operation the point 170' is positive with respect to the point 170 since the load-windings 158 and 160, of the phase-shift circuit 18, offer a high impedance and thus the voltage appearing across the output winding 34, of the oscillator 22, is controlling.

When both the magnetic core members 152 and 154 are saturated then the load windings 156, 158, 160 and 162 no longer offer a high impedance but rather have a low impedance value. Therefore, during the second-quarter cycle of the switching voltages appearing across the output windings 30, 32, 34 and 36, of the oscillator 22, the point 164' is positive with respect to the point 164 and the point 170 is positive with respect to the point 170'. This renders the transistors 114 and 116 conductive and the transistors 118 and 120 non-conductive. Under these conditions current flows from the lower end of the secondary winding 70, of the transformer 16, through the load 20, the filter 148, the emitter electrode 124, of the transistor 116, the collector electrode 140, the collector electrode 138, of the transistor 114, and the emitter electrode 122, to the upper end of the secondary winding 70, as shown. The voltage effecting this current flow through the load 20 is represented at 202.

During the third-quarter of the cycle of the oscillator 22, the polarity of the voltages appearing across the output windings 26, 28, 30, 32, 34 and 36 is opposite to that shown in Fig. 1. Therefore, the transistors 80 and 82, of the modulator 12, are rendered conductive and the transistors 76 and 78 are rendered non-conductive. Current then flows from the terminal 84 through the emitter electrode 90, of the transistor 80, the collector electrode 106, the collector electrode 108, of the transistor 82, the emitter electrode 92, and the primary winding 68, of the transformer 16, to the terminal 84'. The current flow through the primary winding 68 effects induced voltages across the secondary windings 70 and 72 of opposite polarity from that shown in Fig. 1.

During the third-quarter cycle of the switching voltages appearing at the output of the oscillator 22 the point 164' is positive with respect to the point 164 and the point 170 is positive with respect to the point 170'. Thus, the transistors 114 and 116 are maintained in a conductive state and the transistors 118 and 120, of the demodulator 14, are maintained in a non-conductive state. Current then flows, during this third-quarter cycle of operation, from the upper end of the secondary winding 70, of the transformer 16, through the emitter electrode 122, of the transistor 114, the collector electrode 138, the collector electrode 140, of the transistor 116, the emitter electrode 124, the filter 148, and the load 20, to the lower end of the secondary winding 70, as shown. The voltage effecting this current flow through the load 20 is represented at 204.

At 270 degrees of operation, or at the beginning of the fourth-quarter of the cycle of the switching voltages appearing at the output of the oscillator 22, the magnetic core members 152 and 154 are saturated. Therefore, the point 164 becomes positive with respect to the point 164' and the point 170' becomes positive with respect to the point 170. This renders the transistors 114 and 116 non-conductive and the transistors 118 and 120 conductive. Thus, during the fourth-quarter of the cycle of operation current flows from the upper end of the secondary winding 72, of the transformer 16, through the load 20, the filter 148, the emitter electrode 126, of the transistor 118, the collector electrode 142, the collector electrode 144, of the transistor 120, and the emitter electrode 128, to the lower end of the secondary winding 72, as shown. The voltage effecting this current flow through the load 20 is represented in Fig. 2b at 206.

Assuming that the voltage, $V_y$, to be multiplied is applied to the terminals 150 and 150' and that the polarity of the voltage $V_y$ is such that the terminal 150 is positive with respect to the terminal 150' and assuming further that the polarity of the voltage $V_x$ to be multiplied, as applied to the terminals 84 and 84', is such that the terminal 84 is positive with respect to the terminal 84', then the current flows through the control winding 190, of the phase-shift circuit 18, so as to produce magnetomotive forces with respect to the magnetic core members 152 and 154 which are additive to the magnetomotive forces produced by the current flow through the bias winding 184. Since the magnetomotive forces produced by the current flow through the bias winding 184 and the control winding 190 are additive the magnetic core members 152 and 154 will both become saturated later in the cycle of the output voltages of the oscillator 22. Specifically, the magnetic core members 152 and 154 will both become saturated some time during the second-quarter of the switching voltages appearing at the output of the oscillator 22.

Under the latter assumed conditions the point 164 will remain positive with respect to the point 164' and the point 170' will remain positive with respect to the point 170 until some time during the second-quarter of the cycle of the switching voltages appearing across the output windings 30, 32, 34, and 36, of the oscillator 22. Therefore, the transistors 114 and 116, of the demodulator 14, will be maintained in a non-conductive state and the transistors 118 and 120 will be maintained in a conductive state. Thus, current will flow from the secondary winding 72, of the transformer 16, through the load 20 in a direction from right to left, as shown in Fig. 1. The voltage effecting this current flow is represented in Fig. 2c at 208.

At, for example, 135 degrees of operation, the magnetic core members 152 and 154 will both be saturated thus effecting a reversal of the polarity of the voltages between the points 164 and 164' and between the points 170 and 170'. Such an action renders the transistors 114 and 116 conductive and the transistors 118 and 120 non-conductive. Current then flows from the secondary winding 70, of the transformer 16, through the load 20 in a direction from left to right, as shown in Fig. 1. The voltage effecting this current flow is represented at 210 in Fig. 2c.

At 180 degrees of operation the polarity of the voltages across the output windings 30, 32, 34 and 36 reverses and the point 164' becomes positive with respect to the point 164 and the point 170 becomes positive with respect to the point 170'. When this occurs the transistors 114 and 116, of the demodulator 14, are rendered conductive and the transistors 118 and 120 are rendered non-conductive. With the transistors 114 and 116 conductive current flows from the upper end of the secondary winding 70 through the emitter electrode 122, of the transistor 114, the collector electrode 138, the collector electrode 140, of the transistor 116, the emitter electrode 124, the filter 148, and the load 20, to the lower end of the secondary winding 70, as shown. The voltage effecting this current flow is represented at 211 in Fig. 2c.

During the fourth-quarter of the cycle of operation, at, for example, 315 degrees, both the magnetic core members 152 and 154, of the phase-shift circuit 18, are saturated and the polarity of the voltages between the points 164 and 164' and between the points 170 and 170' reverse so as to render the point 164 positive with respect to the point 164' and the point 170' positive with respect to the point 170. This renders the transistors 114 and 116 non-conductive and the transistors 118 and 120 conductive. Current then flows from the secondary winding 72, of the transformer 16, through the load 20 in a direction from left to right as shown in Fig. 1. The voltage effecting this current is represented at 212 in Fig. 2c.

Assuming the polarity of the voltage, $V_y$, applied to the terminals 150 and 150' is reversed so that the terminal 150' is positive with respect to the terminal 150 and the polarity of the voltage, $V_x$, applied to the terminals 84 and 84' remains the same so that terminal 84 is positive with respect to the terminal 84' then current flows in such a direction through the control winding 190, of the phase-shift circuit 18, as to effect magnetomotive forces which oppose the magnetomotive forces produced by the current flow through the bias winding 184. Under these conditions both the magnetic core members 152 and 154 are saturated at some time during the first-quarter cycle of the switching voltages at the output of the oscillator 22. For instance, as represented in Fig. 2d, the saturation takes place at approximately 45 degrees of the operation. As can be seen from Fig. 2d, the negative portions of the alternating voltage are of greater magnitude than the positive portions and therefore the left end of the load 20, as shown in Fig. 1, is positive with respect to the right end.

Fig. 2e illustrates the case in which the polarity of the voltage, $V_x$, applied to the terminals 84 and 84' is such that the terminal 84' is positive with respect to the terminal 84 and the polarity of the voltage, $V_y$, applied to the terminals 150 and 150' is such that the terminal 150' is positive with respect to the terminal 150. During the first half-cycle of operation, current flows from the terminal 84' through the primary winding 66, of the transformer 16, the emitter electrode 86, of the transistor 76, the collector electrode 102, the collector electrode 104, of the transistor 78, and the emitter electrode 88, to the terminal 84. The current flow through the primary winding 66 effects induced voltages across the secondary windings 70 and 72, of the transformer 16, of a polarity opposite to that shown in Fig. 1.

During a portion of the first-quarter of the cycle of operation the point 164 is positive with respect to the point 164' and the point 170' is positive with respect to the point 170. Thus, the transistors 118 and 120, of the demodulator 14, are conductive and the transistors 114 and 116 are non-conductive. Current then flows from the upper end of the secondary winding 72, as shown, through the load 20, the filter 148, the emitter electrode 126, of the transistor 118, the collector electrode 142, the collector electrode 144, of the transistor 120, and the emitter electrode 128, to the lower end of the secondary winding 72, as shown. The voltage effecting this current flow is represented at 214 in Fig. 2e. At, for example, 45 degrees of operation, both the magnetic core members 152 and 154 are saturated and the polarity of the voltage between the points 164 and 164' and between the points 170 and 170' reverses so that the point 164' becomes positive with respect to the point 164 and the point 170 becomes positive with respect to the point 170'. Transistors 114 and 116 are then rendered conductive and transistors 118 and 120 are rendered non-conductive. When this takes place current flows from the upper end of the secondary winding 70, of the transformer 16, through the emitter electrode 122, of the transistor 114, the collector electrode 138, the collector electrode 140, of the transistor 116, the emitter electrode 124, the filter 148, and the load 20, to the lower end of the secondary winding 70, as shown. The voltage effecting this current flow is represented at 216 in Fig. 2e.

During the next half-cycle of operation the transistors 80 and 82, of the modulator 12, are rendered conductive and the transistors 76 and 78 are rendered non-conductive. Current then flows from the terminal 84' through the primary winding 68, of the transformer 16, the emitter electrode 92, of the transistor 82, the collector electrode 108, the collector electrode 106, of the transistor 80, and the emitter electrode 90, to the terminal 84. The current flow through the primary winding 68 effects induced voltages across the secondary windings 70 and 72, of the transformer 16, of a polarity as shown in Fig. 1.

At the beginning of the third-quarter of the cycle of operation the point 164' is positive with respect to the point 164 and the point 170 is positive with respect to the point 170'. Therefore, the transistors 114 and 116 of the demodulator 14 are rendered conductive and the transistors 118 and 120 are rendered non-conductive. Current then flows from the lower end of the secondary winding 70, as shown, through the load 20, the filter 148, the emitter electrode 124, of the transistor 116, the collector electrode 140, the collector electrode 138, of the transistor 114, and the emitter electrode 122, to the upper end of the secondary winding 70, as shown. The voltage effecting this latter current flow is represented at 218 in Fig. 2e.

At, for example, 225 degrees of operation the magnetic core members 152 and 154 are saturated, thus reversing the polarity of the voltage between the point 164 and 164' and between the point 170 and 170'. Specifically, the point 164 becomes positive with respect to the point 164' and the point 170' becomes positive with respect to the point 170. This renders the transistors 114 and 116, of the demodulator 14, non-conductive and the transistors 118 and 120 conductive. Current then flows from the lower end of the secondary winding 72, as shown, through the emitter electrode 128, of the transistor 120, the collector electrode 144, the collector electrode 142, of the transistor 118, the emitter electrode 126, the filter 148, and the load 20, to the upper end of the secondary winding 72, as shown. The voltage effecting this latter current flow is represented at 220 in Fig. 2e. Thus, under the latter assumed conditions, the positive portions of the voltage represented in Fig. 2e are of greater magnitude than the negative portions and therefore the right end of the load 20, as shown, is positive with respect to the left end.

Although a specific type of oscillator has been shown, it is to be understood that other suitable types of oscillators could be substituted for the oscillator 22, shown in Fig. 1.

The apparatus embodying the teaching of this invention has several advantages. For instance, the voltage multiplier of Fig. 1 is polarity sensitive and yet requires only a single-ended input for each voltage to be multiplied. In addition, the voltage multiplier of Fig. 1 has a minimum of power consumption. Further, the apparatus embodying the teachings of this invention requires a minimum of maintenance.

Since numerous changes may be made in the above apparatus and circuits, and different embodiments of the invention may be made without departing from the spirit and the scope thereof, it is intended that all matter contained in the foregoing description or shown in the accompanying drawings shall be interpreted as illustrative and not in a limiting sense.

I claim as my invention:

1. In a voltage multiplier for obtaining the product of a first and a second signal, the combination comprising, an oscillator having an output, magnetic core means, winding means disposed in inductive relationship with said magnetic core means, switching means interconnected with the output of said oscillator, circuit means for interconnecting said switching means with said winding means and for applying said first signal to said winding means in accordance with the switching operation of said switching means, other winding means disposed in inductive relationship with said magnetic core means for obtaining an alternating voltage having a rectangular wave shape whose amplitude is proportional to the magnitude of said first signal and whose frequency is proportional to the frequency of said oscillator, a phase-shift circuit having an input and an output, said phase-shift circuit being interconnected with the output of said oscillator so as to be controlled in accordance with the frequency of said oscillator and the input of said phase-shift circuit being responsive to said second signal, and a demodulator interconnected with the output of said phase-shift circuit and with said other winding means whereby said phase-shift circuit and said demodulator cooperate to vary the difference in the positive and negative half-cycle widths of said alternating voltage in accordance with the magnitude of said second signal.

2. In a voltage multiplier for obtaining the product of a first and a second signal, the combination comprising, an oscillator having an output, magnetic core means, winding means disposed in inductive relationship with said magnetic core means, switching means interconnected with the output of said oscillator, circuit means for interconnecting said switching means with said winding means and for applying said first signal to said winding means in accordance with the switching operation of said switching means, other winding means disposed in inductive relationship with said magnetic core means for obtaining an alternating voltage having a rectangular wave shape whose amplitude is proportional to the magnitude of said first signal and whose frequency is proportional to the frequency of said oscillator, a phase-shift circuit having an input and an output, said phase-shift circuit being interconnected with the output of said oscillator so as to be controlled in accordance with the frequency of said oscillator and the input of said phase-shift circuit being responsive to said second signal, other switching means, circuit means for interconnecting said other winding means with said other switching means, and other circuit means for interconnecting the output of said phase-shift circuit with said other switching means so as to control the switching operation of said other switching means in accordance with the operation of said phase-shift circuit.

3. In a voltage multiplier for obtaining at a load the product of a first and a second signal, the combination comprising, an oscillator having an output, magnetic core means, winding means disposed in inductive relationship with said magnetic core means, switching means interconnected with the output of said oscillator, circuit means for interconnecting said switching means with said winding means and for applying said first signal to said winding means in accordance with the switching operation of said switching means, other winding means disposed in inductive relationship with said magnetic core means for obtaining an alternating voltage having a substantially rectangular wave shape whose amplitude is proportional to the magnitude of said first signal and whose frequency is proportional to the frequency of said oscillator, other switching means, adapted to control the flow of current to said load, other circuit means for interconnecting said other winding means with said other switching means, and a phase-shift circuit including magnetic core means, load windings disposed in inductive relationship with the magnetic core means of the phase-shift circuit, further circuit means for so interconnecting said other switching means with said load windings and with the output of said oscillator that the switching operation of said other switching means varies in accordance with the flux level in the magnetic core means of the phase-shift circuit, control winding means disposed in inductive relationship with the magnetic core means of the phase-shift circuit, and still further circuit means for rendering said control winding means responsive to said second signal to thus vary the flux level in the magnetic core means of the phase-shift circuit in accordance with the magnitude of said second signal, to thereby vary the switching operation of said another switching means in accordance with the magnitude of said second signal.

References Cited in the file of this patent

UNITED STATES PATENTS

| | | |
|---|---|---|
| 2,643,819 | Lee et al. | June 30, 1953 |
| 2,662,116 | Potier | Dec. 8, 1953 |
| 2,725,191 | Ham | Nov. 29, 1955 |
| 2,773,641 | Baum | Dec. 11, 1956 |
| 2,780,725 | Johanson | Feb. 5, 1957 |
| 2,780,782 | Bright | Feb. 5, 1957 |
| 2,808,990 | Allen | Oct. 8, 1957 |